US008139487B2

(12) United States Patent
Kasheff et al.

(10) Patent No.: US 8,139,487 B2
(45) Date of Patent: Mar. 20, 2012

(54) STRATEGIES FOR SELECTING A FORMAT FOR DATA TRANSMISSION BASED ON MEASURED BANDWIDTH

(75) Inventors: Zardosht Kasheff, Bellevue, WA (US); Vladimir K. Stoyanov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 11/680,169

(22) Filed: Feb. 28, 2007

(65) Prior Publication Data
US 2008/0205270 A1    Aug. 28, 2008

(51) Int. Cl.
*H04J 1/16* (2006.01)
(52) U.S. Cl. ........ 370/235; 370/230; 370/236; 370/252; 370/468; 370/477
(58) Field of Classification Search ................... 370/229, 370/230, 234, 235, 473, 236, 252, 468, 477
See application file for complete search history.

(56) References Cited

U.S. PATENT DOCUMENTS

| | | | |
|---|---|---|---|
| 5,463,422 A | 10/1995 | Simpson et al. | |
| 5,729,535 A | 3/1998 | Rostoker et al. | |
| 6,014,694 A | 1/2000 | Aharoni et al. | |
| 6,215,789 B1 * | 4/2001 | Keenan et al. | 370/399 |
| 6,389,473 B1 * | 5/2002 | Carmel et al. | 709/231 |
| 6,496,980 B1 * | 12/2002 | Tillman et al. | 725/90 |
| 6,580,694 B1 * | 6/2003 | Baker | 370/252 |
| 6,683,980 B1 * | 1/2004 | Meier et al. | 382/166 |
| 6,766,407 B1 * | 7/2004 | Lisitsa et al. | 710/316 |
| 6,813,244 B1 * | 11/2004 | He et al. | 370/235 |
| 6,850,541 B2 * | 2/2005 | Gross | 370/473 |
| 6,894,724 B2 * | 5/2005 | Patel et al. | 348/373 |
| 7,003,794 B2 * | 2/2006 | Arye | 725/100 |
| 7,016,970 B2 * | 3/2006 | Harumoto et al. | 709/233 |
| 7,073,192 B1 * | 7/2006 | Smith | 725/95 |
| 7,249,291 B2 * | 7/2007 | Rasmussen et al. | 714/701 |
| 7,315,898 B2 * | 1/2008 | Kohno | 709/230 |
| 7,349,977 B2 * | 3/2008 | Brown et al. | 709/235 |
| 7,436,772 B2 | 10/2008 | Padhye et al. | |
| 7,545,749 B2 * | 6/2009 | Jourdain et al. | 370/252 |
| 7,768,934 B2 * | 8/2010 | Yamanaka et al. | 370/252 |
| 7,784,076 B2 * | 8/2010 | Demircin et al. | 725/81 |

(Continued)

FOREIGN PATENT DOCUMENTS

JP    2000228687 A    8/2000

(Continued)

OTHER PUBLICATIONS

PCT Search Report for PCT Application No. PCT/US2008/053505, mailed Jul. 1, 2008 (10 pages).

(Continued)

*Primary Examiner* — Ricky Ngo
*Assistant Examiner* — Dewanda Samuel
(74) *Attorney, Agent, or Firm* — Lee & Hayes, PLLC

(57) ABSTRACT

A strategy is described for transmitting data from a first entity to a second entity. The data is transmitted using a format that is selected to accommodate available bandwidth in a communication coupling that connects the first entity and the second entity. The first entity or the second entity can comprise a terminal service (TS) client device and a terminal service (TS) server device, respectively, or vice versa. The strategy can compute the bandwidth by recording timing information associated with the transmission of a short message followed by a longer message from the first entity to the second entity. The short message is used to remove the effects of latency in the computation of bandwidth.

18 Claims, 7 Drawing Sheets

U.S. PATENT DOCUMENTS

| | | | |
|---|---|---|---|
| 2002/0169880 A1* | 11/2002 | Loguinov et al. | 709/228 |
| 2003/0079222 A1* | 4/2003 | Boykin et al. | 725/31 |
| 2004/0045030 A1 | 3/2004 | Reynolds et al. | |
| 2004/0057420 A1 | 3/2004 | Curcio et al. | |
| 2004/0117427 A1 | 6/2004 | Allen et al. | |
| 2004/0131115 A1* | 7/2004 | Burgess et al. | 375/240.01 |
| 2005/0018768 A1 | 1/2005 | Mabey et al. | |
| 2005/0097217 A1* | 5/2005 | Val et al. | 709/233 |
| 2006/0069797 A1* | 3/2006 | Abdo et al. | 709/231 |
| 2006/0098827 A1 | 5/2006 | Paddock et al. | |
| 2006/0114834 A1* | 6/2006 | Cheung et al. | 370/252 |
| 2006/0156201 A1 | 7/2006 | Zhang et al. | |
| 2006/0184992 A1* | 8/2006 | Kortum et al. | 725/135 |
| 2007/0253445 A1* | 11/2007 | Lee | 370/468 |

FOREIGN PATENT DOCUMENTS

| | | |
|---|---|---|
| JP | 2001053619 | 2/2001 |
| JP | 2002259257 | 9/2002 |
| JP | 2006222643 | 8/2006 |
| JP | 2006270953 A | 10/2006 |
| WO | WO0072599 A1 | 11/2000 |
| WO | WO2005043329 | 5/2005 |
| WO | WO2006099086 A1 | 9/2006 |

OTHER PUBLICATIONS

Christianson, et al., "Rate Adaptation for Improved Audio Quality in Wireless Networks," accessible at <<http:// ieeexplore.ieee.org/iel5/6651/17761/00819512.pdf?isNumber=>>, IEEE No. 0-7803-5904-6/99/$10.00, 1999, pp. 363-367.

Ramkishor, et al., "Bandwidth Adaptation for MPEG-4 Video Streaming over the Interne,t" accessible at <<http://www.geocities.com/ramkishor/papers/DICTA__CameraReady_48.pdf>>, DICTA 2002: Digital Image Computing Techniques and Applications, Jan. 21-22, 2002, Melbourne, Australia, pp. 1-6.

Vinton, et al., "A Scalable and Progressive Audio Codec," accessible at <<http://ieeexplore.ieee.org/iel5/7486/20358/00940358.pdf?isNumber=>>, IEEE No. 0-7803-7041-4/01/$10.00, 2001, pp. 3277-3280.

Translated Chinese Office Action mailed Jun. 9, 2011 for Chinese patent application No. 200880006288.6, a counterpart foreign application of U.S. Appl. No. 11/680,169.

Japanese Office Action mailed Oct. 20, 2011 for Japanese patent application No. 2009-551778, a counterpart foreign application of U.S. Appl. No. 11/680,169, 3 pages.

* cited by examiner

AUDIO CAPTURE EXAMPLE

STRATEGIES FOR SELECTING A FORMAT FOR DATA TRANSMISSION BASED ON MEASURED BANDWIDTH

BACKGROUND

A terminal service (TS) system allows a TS client device to interact with an application being run on a remote TS server device. A user who interacts with the application receives generally the same user experience that would be provided if the application were implemented locally by the TS client device. Implementing the application on the TS server device affords a number of benefits. For instance, it may be easier to administer an application that is maintained at a central location.

A TS session may involve sending data from the TS client device to the TS server device, or vice versa. It is generally desirable to transmit this data with high quality and low latency. Many network environments (such as the Internet), however, exhibit variable amounts of available bandwidth. In view of this complication, it is a challenging task to determine how best to send data within a TS system.

SUMMARY

A strategy is described for transmitting data between a first entity and a second entity via a network. The first entity can comprise a terminal service (TS) client device and the second entity can comprise a TS server device, or vice versa. According to one exemplary implementation, the strategy determines available bandwidth on the network by extracting timing information from the transmission of a short message followed by a larger message having size S. The strategy uses information extracted from the transmission of the short message to remove latency considerations from the determination of bandwidth. The strategy uses the determined bandwidth to select a data compression/decompression format and uses the selected format, in turn, in transmitting data from the TS client device to the TS server device, or vice versa. The strategy can select a format that accommodates relatively high quality when a relatively large amount of bandwidth is available. The strategy can select a format that accommodates a lower quality when less bandwidth is available. In this manner, the strategy can dynamically and seamlessly adjust the format used during the transmission of the data to accommodate prevailing network conditions.

In one exemplary implementation, the data may comprise audio data or video data. In the case of audio data, for example, the strategy can be used to transmit audio data that is captured by the TS client device to the TS server device. The TS server device can record the captured audio data or perform some other processing on the captured audio data. Or the strategy can be used to transmit audio data from the TS server device to the TS client device for playback at the TS client device.

Additional exemplary implementations and attendant benefits are described in the following.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for sending data between a first entity and a second entity using a compression/decompression format that is dynamically selected based on a determination of available bandwidth. The strategy can be manifested in various systems, apparatuses, modules, procedures, storage mediums, data structures, and other forms.

This disclosure includes the following sections. Section A sets forth an overview of the strategy for transmitting data between a first entity and a second entity. Section B describes the exemplary application of the strategy to different scenarios, including audio capture and audio playback.

A. Overview of Strategy

A.1. Exemplary System

As a preliminary note, any of the functions described with reference to the figures can be implemented using software, firmware, hardware (e.g., fixed logic circuitry), manual processing, or a combination of these implementations. The term "logic, "module," "component," system" or "functionality" as used herein generally represents software, firmware, hardware, or a combination of these elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

Figure 1:
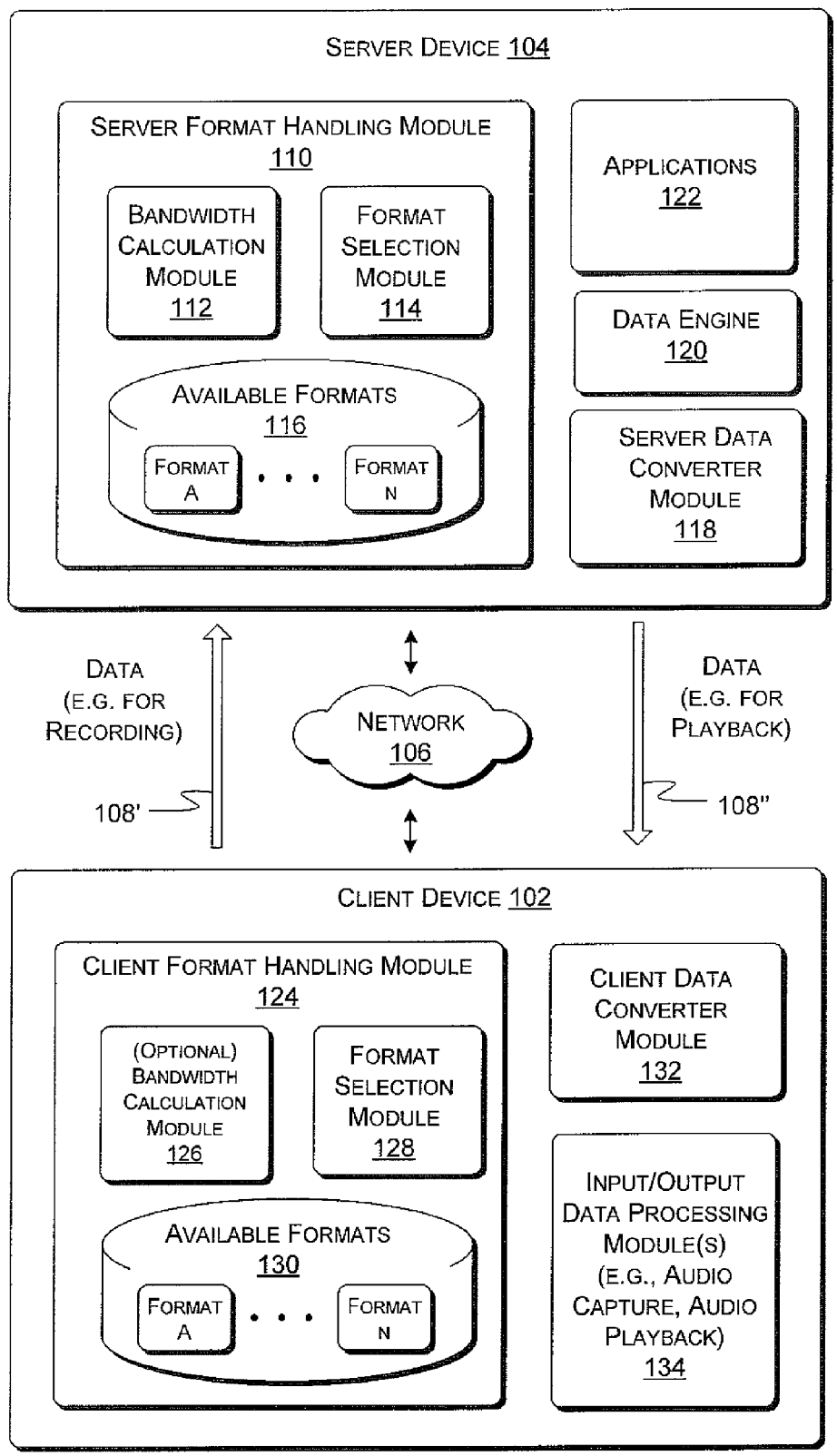
FIG. 1 shows an exemplary system for transmitting data from a terminal service (TS) client device to a terminal service (TS) server device, or vice versa.

FIG. 1 shows a system 100 in which data is transmitted from a first entity to a second entity via a communication coupling. Or data can be transmitted from the second entity to the first entity. In one example, the first entity can comprise a terminal service (TS) client device 102, while the second entity can comprise a terminal service (TS) server device 104. In another example, the first entity can comprise the TS server device 104 and the second entity can comprise the TS client device 102. The TS client device 102 and the TS server device 104 communicate with each other via a network 106.

In terminal service technology, the TS client device 102 can interact with one or more applications that are implemented by the TS server device 104. The user at the TS client device 102 receives generally the same user experience as if the applications were being run on the TS client device 102. TS technology confers various benefits (compared to local execution of applications by client devices). According to one exemplary benefit, TS technology allows applications to be administered in a more efficient manner compared to the conventional case in which applications are implemented locally by client devices.

To facilitate explanation, the system 100 is described in the specific context of the interaction between the TS client device 102 and the TS server device 104, rather than the more generic first entity and second entity. It should be kept in mind, however, that the principles described here can be applied to any system in which data is being transmitted over a communication coupling from any first entity to any second entity. To be more specific, the principles also find use in environments that do not employ terminal service technology.

The network 106 can be implemented in different ways to suit different technical and commercial environments. For instance, the network 106 can include any kind of digital network (or combination of digital networks), such as a wide area network (e.g., the Internet), an intranet, Digital Subscriber Line (DSL) network infrastructure, point-to-point coupling infrastructure, and so on. Although not shown, the network 106 can include various hardwired and/or wireless links, routers, gateways, name servers, and so on. The network 106 can be governed by any protocol or combination of protocols.

In one scenario of TS technology, the TS client device 102 is used to transmit data to the TS server device 104. For example, the TS client device 102 device can redirect audio data or video data (or any other data) that is captured by an input device at the TS client device 102 to the TS server device 104. In this case, the TS server device 104 can be used to remotely record the data or perform any other action on the data. In another scenario, the TS server device 104 is used to forward data to the TS client device 102 for playback at the TS client device 102. For instance, the user at the TS client device 102 can interact with an audio player application that is implemented at the TS server device 104. That audio player application can direct prerecorded audio content over the network 106 to the TS client device 102 for playback at the TS client device 102. Still other applications of TS technology are possible. In general, the arrows (108', 108") illustrate that the system 100 can forward (or "redirect") data both from the TS client device 102 to the TS server device 104 and from the TS server device 104 to the TS client device 102.

The system 100 transmits data from the TS client device 102 to the TS server device 104 (or vice versa) using a selected format. The format may, in part, control what technique is used to compress the data prior to transfer over the network 106 and what technique is used to decompress the data upon receipt at the destination device (102 or 104). Different formats can offer varying degrees of compression and quality. On one end of the spectrum, a format may offer a relatively low degree of compression and a relatively high quality. On the other end of the spectrum, another format may offer a relatively high degree of compression but with a lower degree of quality. The high quality formats generally consume more bandwidth than the low quality formats.

In general, it may be desirable to transmit the data using the highest degree of quality permitted by the available bandwidth. However, the bandwidth of the network 106 may vary in a dynamic manner over the course of a data communication session. To address this situation, the system 100 repeatedly measures the bandwidth that is available over the course of the session. Based on the bandwidth measurements, the system 100 repeatedly reevaluates whether it is using the most appropriate format to transmit data. For instance, if the amount of available bandwidth decreases above a prescribed threshold increment (e.g., 10 percent), the system 100 may select another format that offers higher compression (and thus consumes less bandwidth), but provides lower quality. If the amount of available bandwidth increases above a threshold increment (e.g., 10 percent), then the system 10 may select another format that offers lower compression (and thus consumes more bandwidth), but provides higher quality.

To function in the above-described manner, one or more of the TS client device 102 and the TS server device 104 include functionality for evaluating bandwidth and selecting an appropriate format based on the bandwidth.

First consider the functionality provided by the TS server device 104. The TS server device 104 includes a server format handling module 110. The purpose of the server format handling module 110 is to measure the prevailing bandwidth in the network 106 and to select a format that is best suited for the measured bandwidth. To function in this manner, the server format handling module 110 includes a server bandwidth calculation module 112, a server format selection module 114, and a server format store 116 that provides information regarding available formats. The server bandwidth calculation module 112 is used to calculate the bandwidth that is available to transmit data between the TS client device 102 and the TS server device 104. The server format selection module 114 is used to select one of the formats identified in the server format store 116 based on the measured bandwidth. Additional details regarding the manner in which the server bandwidth calculation module 112 computes the available bandwidth are provided below in the context of the discussion of FIG. 2.

The TS server device 104 also includes a server data converter module 118. The purpose of the server data converter module 118 is to use the selected format (identified by the server format handling module 110) to convert the data to be transmitted (or received) over the network 106. For example, the server data converter module 118 can use a selected format to decompress audio data that is captured by the TS client device 102 and sent to the TS server device 104 by the TS client device 102. Also, the server data converter module 118 can use a selected format to compress audio data that is to be transmitted over the network 106 to the TS client device 102 for playback.

The TS server device 104 also includes a data engine 120. The purpose of this module 132 is to perform various data processing operations on the data. For example, in the case of audio data, the data engine 120 can perform mixing operations and other transformative operations on the audio data.

The TS server device 104 also includes one or more applications 122. The applications 122 can comprise any high-level functionality with which the user at the TS client device 102 may interact. For example, in the audio playback scenario, one of the applications 122 may comprise an audio player application. The audio player application may present a user interface with which the user may interact to select and play back songs and other audio files via the TS client device 102. The user can adjust the playback characteristics using various user interface controls (e.g., sliders to control volume, etc.).

Now turning to the TS client device 102, this device 102 includes a client format handling module 124. The client format handling module 124 generally serves the same function as the server format handling module 110. More precisely stated, the client format handling module 124 performs a function which complements the operation of the server format handling module 110. For example, where the server format handling module 110 selects an identified decompression format, the client format handling module 124 selects a complementary compression format. On the other hand, where the server format handling module 110 selects an identified compression format, the client format handling module 124 selects a complementary decompression format.

To function in the manner described above, the client format handling module 124 includes an optional bandwidth calculation module 126, a client format selection module 128, and a format store 130 that provides information regarding available formats. These components generally operate in the same (e.g., complementary) manner to that described above with respect to the server format handling module 110. The client bandwidth calculation module 126 is optional in the sense that, alternatively, the server format handling module 110 can compute the bandwidth and select an appropriate format and then convey the selected format to the client format handling module 124, thereby avoiding the need for the client bandwidth calculation module 126 to make a bandwidth determination itself. The explanation to follow provides more details on the exchange of formatting messages between the server format handling module 110 and the client format handling module 124.

The TS client device 102 also includes a client data converter module 132. The purpose of this module 132 is to convert data that is sent to or received by the TS server device 104 using the format selected by the client server format handling module 124. For example, in the case of audio capture, the client data converter module 132 uses a selected compression format to compress input audio data for transmission over the network 106 to the TS server device 104.

The TS client device 102 also includes an input/output data processing module 134. As the name suggests, the input/output data processing module 134 can comprise various devices for inputting data or outputting data. The input devices can include audio capture devices (e.g., microphones, etc.), video capture devices (e.g., CCD capture mechanisms, etc.), and so forth. The output devices can include audio output devices (e.g., speakers, etc.), display devices, and so forth.

A.2. Exemplary Manner of Operation

Figure 2:
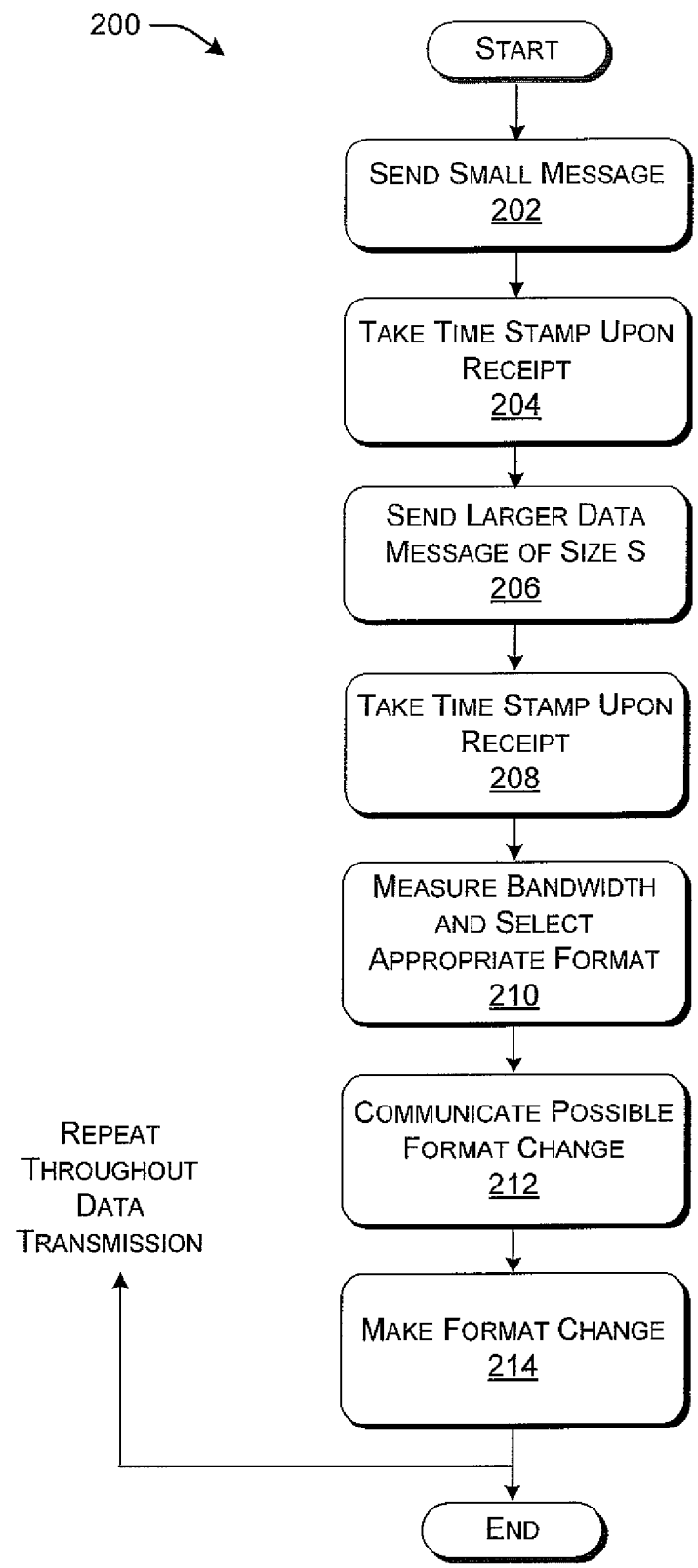
FIG. 2 is a flowchart that shows an exemplary manner of operation of the system of FIG. 1.

FIG. 2 shows a procedure 200 which illustrates how the system 100 of FIG. 1 can measure bandwidth and select a format based on the measured bandwidth. This procedure 200 can take place in the context of transmitting data from the TS client device 102 to the TS sever device 104, or vice versa. In view of this generality, the procedure 200 will be described in the context of a first entity and a second entity, keeping in mind that the first entity can comprise either the TS client device 102 or the TS server device 104, and the second entity can likewise comprise either the TS client device 102 or the TS server device 104. Section B will render the procedure 200 more concrete by describing the procedure 200 in the context of specific scenarios.

To facilitate discussion, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

In block 202, the first entity transmits a first message that has a negligible size. The size is negligible in the sense that the time to transmit this message depends primarily on the latency within the network 106, rather than the size of the message.

In block 204, the second entity receives the first message and records the time at which the message is received (e.g., as reflected by a time stamp).

In block 206, the first entity sends a larger message of size S immediately after the small message (sent in block 202). The larger message of size S may comprise one or more packets that contain part of the data that is to be transmitted. For example, when transmitting audio data, the larger message of size S may comprise one or more packets of audio data. Alternatively, the larger message of size S may comprise one or more packets that contain data that is supplemental to the main flow of data to be exchanged. For example, this other data may provide setup (configuration) information. Or the other data may comprise arbitrary information that has no meaningful use beyond the measurement of bandwidth.

In block 208, the second entity receives the second message and records the time at which the message is received (e.g., as reflected by a time stamp).

In block 210, the system 100 uses the information collected in operations 204 and 208 to compute the bandwidth of data transmission. In one case, the bandwidth can be computed by subtracting the time of receipt of the first message from the time of receipt of the second message, and dividing the size S of the second message by this difference. The subtraction operation is useful to remove the effects of latency in the computation of bandwidth.

Block 210 also involves selecting an appropriate format based on the measured bandwidth. For example, the system 100 selects a relatively high quality format (with low compression) when there is ample bandwidth in the network 106. The system 100 selects a relatively low quality format (with high compression) when there is less ample bandwidth in the network 106.

In block 212, the system 100 communicates its format selections to appropriate entities within the system 100. For example, assume that the second entity is the agent which actually calculates the bandwidth and selects an appropriate format based on the bandwidth. The second entity can send a message to the first entity, which notifies the first entity of the selected format.

In block 214, the system 100 can formally make the format changes selected in operation 212. For example, in an audio capture scenario, the client format handling module 124 can select an appropriate compression format and the server format handling module 110 can select an appropriate complementary decompression format. In an audio playback scenario, the client format handling module 124 can select an appropriate decompression format and the server format handling module 110 can select an appropriate compression format.

The arrow which loops around and points back to the top of the procedure 200 indicates that the procedure 200 is repeated a plurality of times throughout a data transmission session. By virtue of this procedure 200, the system 100 can dynamically vary the compression/decompression format in use to mirror the prevailing bandwidth available in the network 106. This allows the system 100 to transmit data using the best possible quality that the network 106 will accommodate at any given moment.

A.3. Exemplary Processing Functionality

Figure 3:
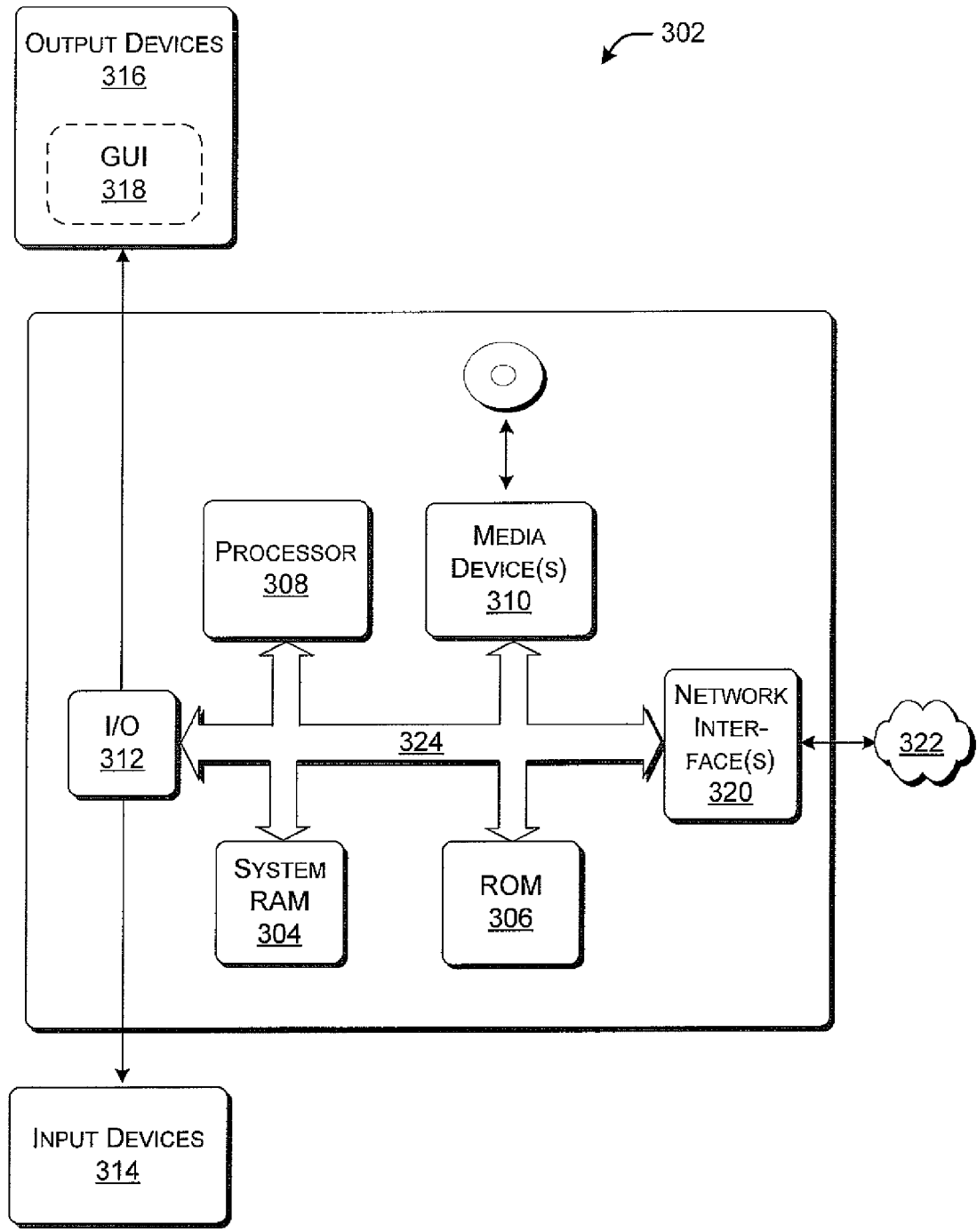
FIG. 3 shows exemplary processing functionality for implementing any aspect of the system of FIG. 1.

FIG. 3 sets forth exemplary processing functionality 302 that can be used to implement any aspect of system 100 shown in FIG. 1 In one non-limiting case, for instance, the processing functionality 302 may represent any computer machine used to implement the TS client device 102 or any computer machine used to implement the TS server device 104.

The processing functionality 302 can include various volatile and non-volatile memory, such as RAM 304 and ROM 306, as well as one or more central processing units (CPUs) 308. The processing functionality 302 can perform various operations identified above when the CPU 308 executes instructions that are maintained by memory (e.g., 304, 306, or elsewhere). The processing functionality 302 also optionally includes various media devices 310, such as a hard disk module, an optical disk module, and so forth.

The processing functionality 302 also includes an input/output module 312 for receiving various inputs from the user (via input devices 314), and for providing various outputs to the user (via output devices 316). The input devices 314 can include a keyboard, mouse-type device, microphone, etc. One particular output device may include a display apparatus and an associated graphical user interface (GUI) 318. Another output device may include a speaker for presenting audio data. The processing functionality 302 can also include one or more network interfaces 320 for exchanging data with other devices via one or more communication couplings 322. The communication couplings 322 may comprise the above-described network 106. One or more communication buses 324 communicatively couple the above-described components together.

B. Examples

Two examples will help render the above explanation more concrete. The first example involves audio capture. In this case, the TS client device 102 captures audio data (e.g., with a microphone) and transmits the audio data to the TS server device 104 via the network 106. In doing so, the TS client device 102 compresses the audio data using a selected format and the TS server device 104 decompresses the audio data using a complementary selected format. A second example involves audio playback. In this case, the TS server device 104 sends audio data to the TS client device 102 for playback to the user at the TS client device 102. In doing so, the TS server device 104 compresses the audio data using a selected format and the TS client device 102 decompresses the audio data using a complementary selected format.

B.1. Audio Capture

Figure 4:
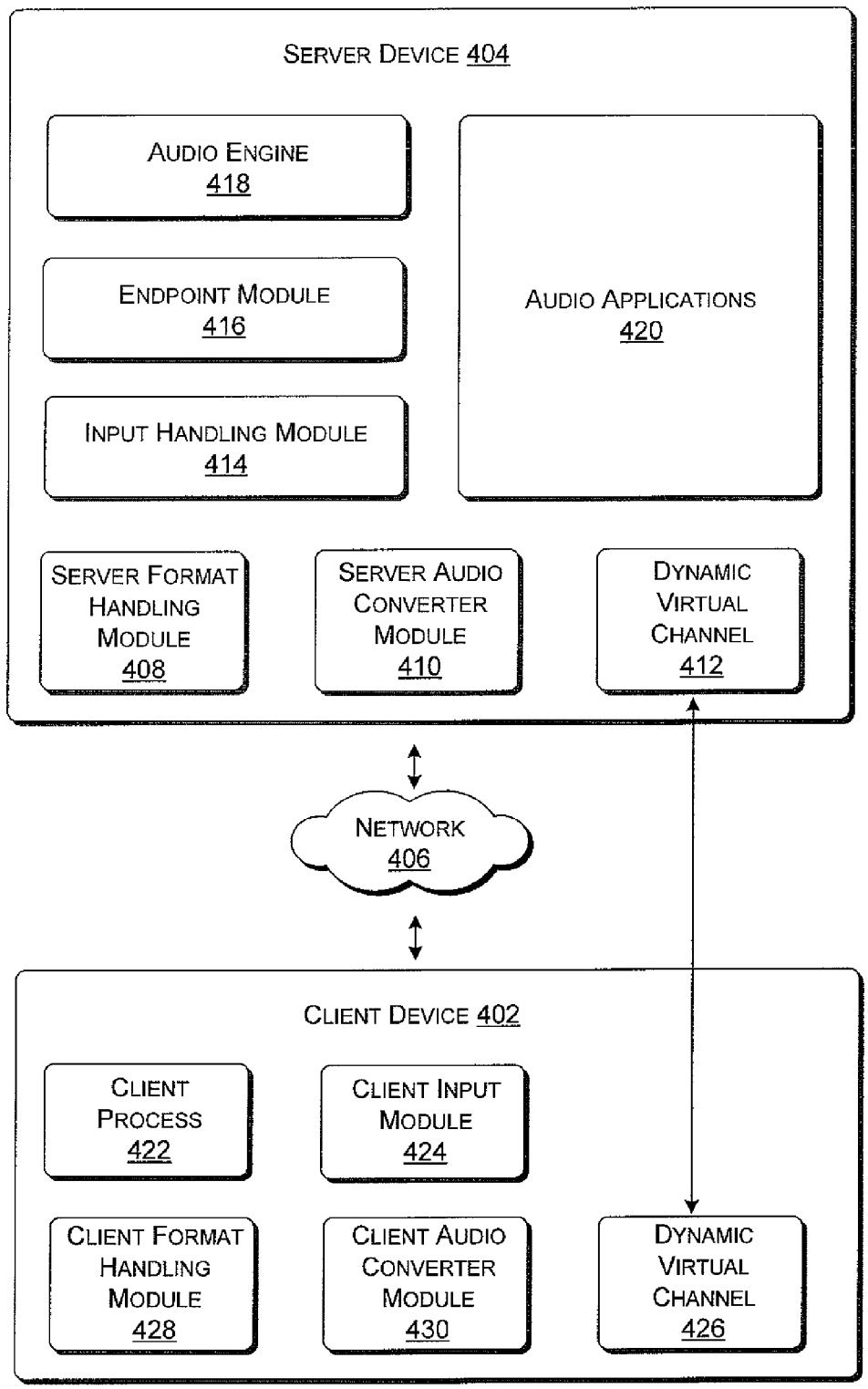
FIG. 4 shows an application of the system of FIG. 1 to the transmission of captured audio data from the TS client device to the TS server device.

FIG. 4 is a system 400 which illustrates the audio capture scenario in greater detail. The system 400 includes the same main components introduced in the context of FIG. 1, namely, a TS client device 402, a TS server device 404, and a network 406 which couples together the TS client device 402 and the TS server device 404.

Beginning with the TS server device 404, this device includes a server format handling module 408 and a server audio converter module 410. These modules perform the same function described above in the context of FIG. 1, namely measuring bandwidth, selecting a format that is best suited to the measured bandwidth, and converting audio data using the selected format.

The TS server device 404 also includes a dynamic virtual channel 412. This module 412 refers to functionality which implements a method of transport for audio data to the TS client device 402.

The TS server device 404 also includes an input handling module 414. This module 414 manages the server format handling module 408 and the server audio converter module 410. This module 414 also maintains a buffer that stores received audio data for higher level components of the TS server device 404.

The TS server device 404 also includes an endpoint module 416. This module 416 retrieves audio data from the input handling module 414 and passes it to higher Level components of the TS server device 404.

The TS server device 404 also includes an audio engine 418, which performs the same role as the same-named module of FIG. 1. That is, this engine 418 performs various data processing operations on the audio data, such as mixing. The endpoint module 416 acts as a data, control, and status interface to streams of data coming in or going out of the audio engine 418.

The TS server device 404 also includes various applications 420. The applications 420 perform any high-level operation pertaining to audio data (e.g., audio data received from the TS client device 402). The audio engine 418 forwards processed audio data to the applications 420.

Turning now to the TS client device 402, this component includes a client process module 422. The client process module 422 represents any operation performed by the TS client device 402.

The TS client device 402 also includes a client input module 424. This module 424 records audio data captured by the TS client device 402.

The TS client device 402 also includes a dynamic virtual channel 426. This module 426 refers to functionality which implements a method of transport for audio data. Data sent on the TS client device's 402 virtual channel 426 is received on the TS server device's 404 virtual channel 412, and vice versa.

The TS client device 402 also includes a client format handling module 428 and a client audio converter module 430. These modules perform the same function identified above with respect to FIG. 1. For instance, the client audio converter module 430 can convert audio data in uncompressed PCM format to a selected format that is identified by the client format handling module 428.

Figure 5:
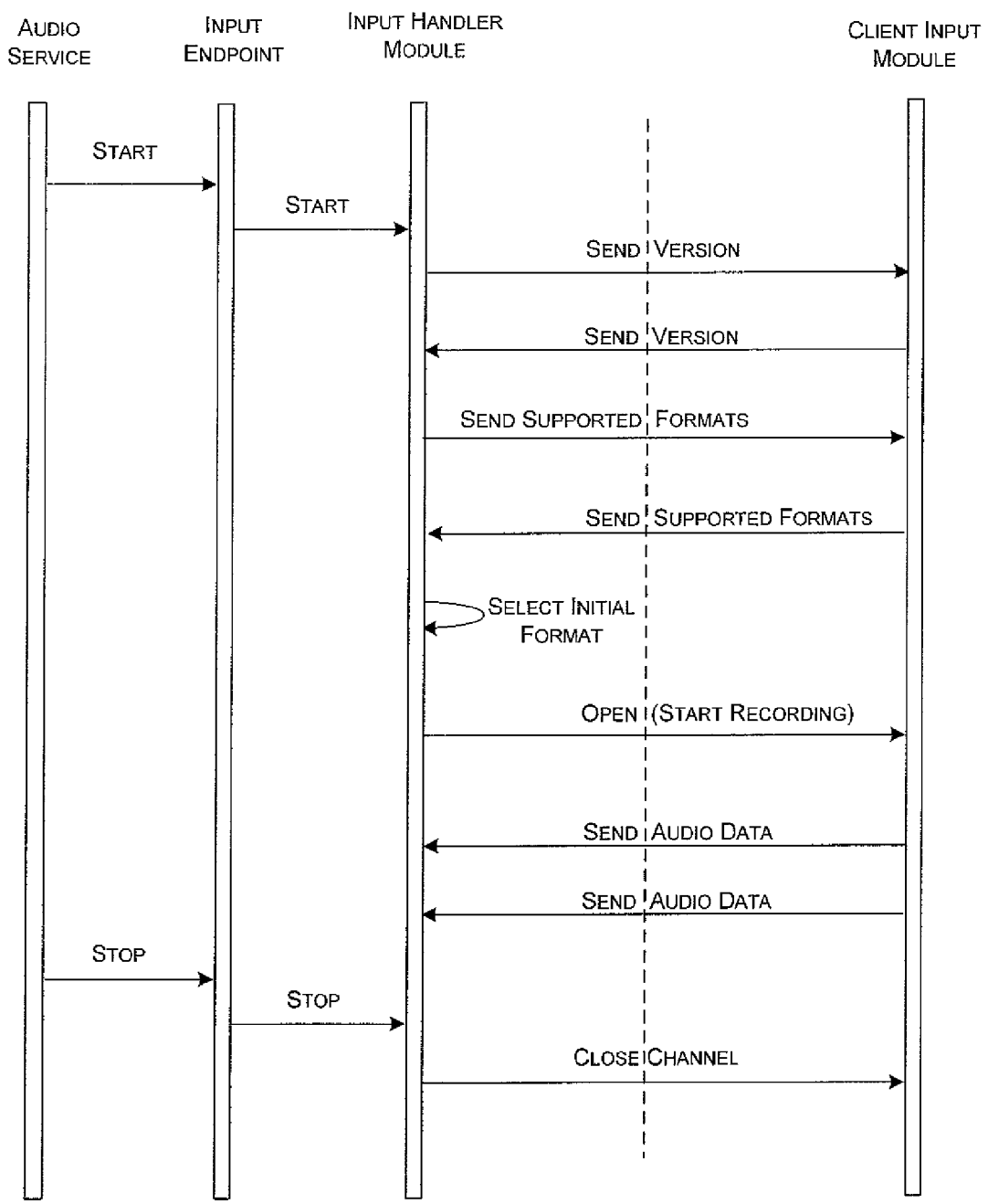
FIGS. 5-7 are timing diagrams which explain an exemplary manner of operation of the system of FIG. 4.
Figure 6:
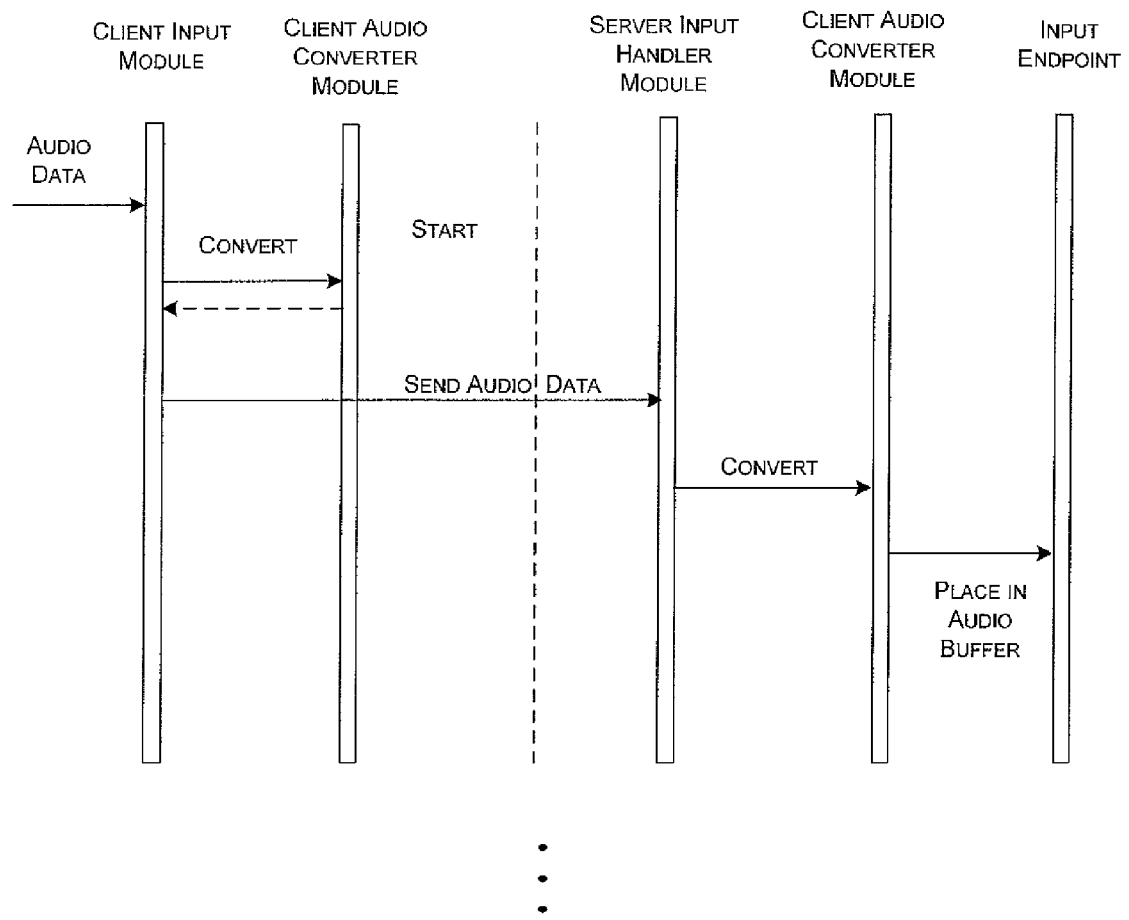
Figure 7:
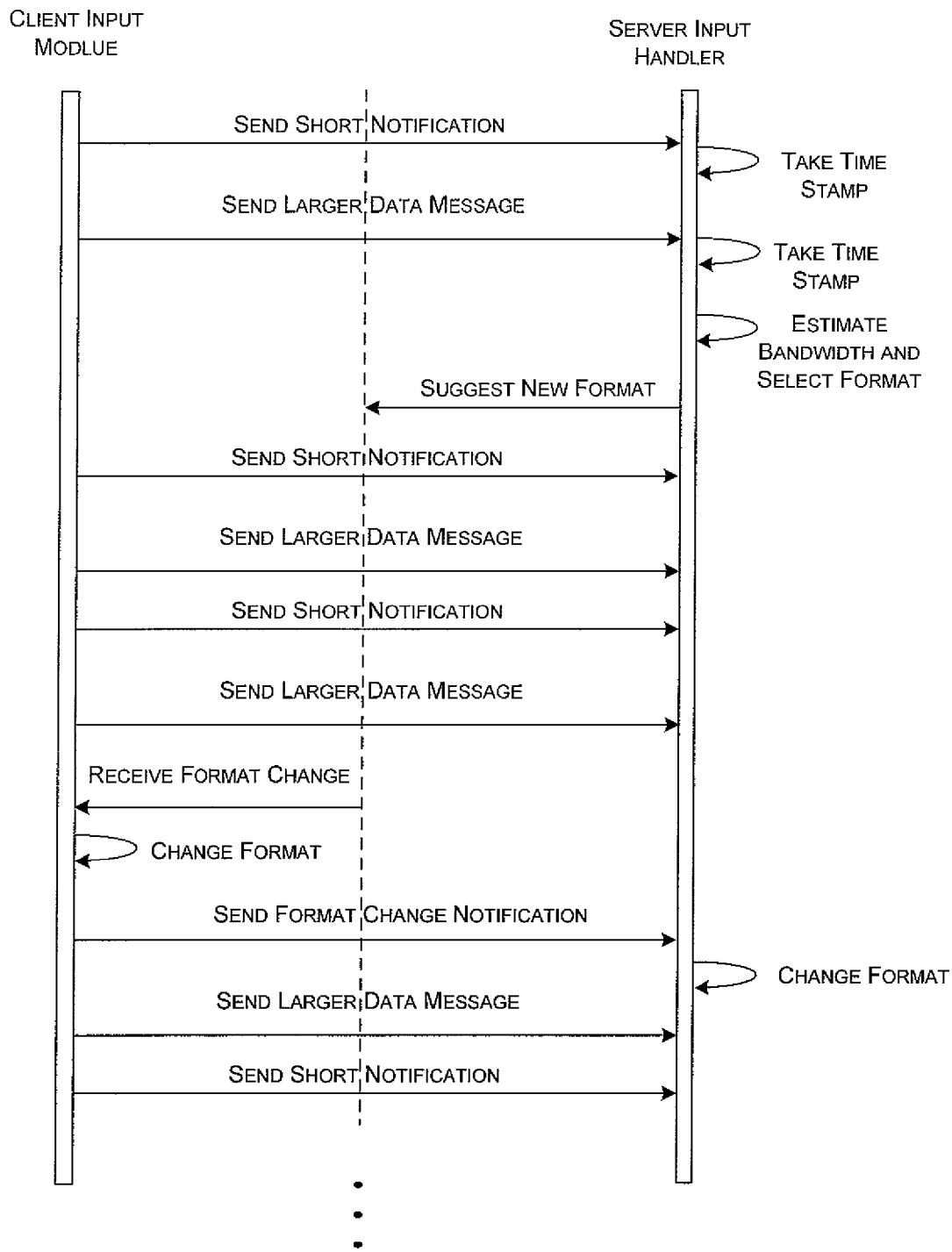

FIGS. 5-7 illustrate one exemplary manner of operation of the system 400 of FIG. 4 By way of overview, in the audio capture scenario: 1) the TS client device 402 records audio data in an uncompressed format; 2) the TS client device 402 compresses audio data using a selected format and sends the compressed audio data to the TS server device 404; 3) the TS server device 404 decompresses the received audio data; and 4) the TS server device 404 passes the uncompressed audio data to the audio engine 428.

The protocol is set forth in more detail below. FIG. 5 shows an overview of the protocol. FIG. 6 shows the data converting aspects of the protocol. And FIG. 7 shows the bandwidth measurement and format selection aspects of the protocol.

Starting with FIG. 5, at the start of an audio capture operation, an audio service makes a call to the endpoint module 416 to commence a recording operation. This is performed by calling a Start( ) method. To start recording, the endpoint module 416 begins information exchange with the TS client device 402. More specifically, the TS server device 404 opens a dynamic virtual channel (412, 426) to the TS client device 402 and exchanges version information and format information with the TS client device 402. In one exemplary case, network performance information can be extracted in the course of exchanging this format information, and this performance information can be used to estimate bandwidth, which, in turn, can be used to select an initial format for use in compressing and decompressing data. At this point, the TS server device 404 requests the TS client device 402 to begin capturing audio data.

The TS client device 402 begins transmitting audio data to the TS server device 404. FIG. 6 illustrates this operation in greater detail. First, the TS client device 402 captures audio data from a microphone. Then, the TS client device 402 compresses the captured audio data using the selected compression format. The TS client device 402 transmits the compressed audio data to the TS server device 404, upon which the TS server device 404 receives this data and decompresses it using the selected format. The TS server device 404 places the decompressed audio data into a buffer associated with the endpoint module 416. The audio engine 418 retrieves the audio data from the endpoint module 416.

Returning to FIG. 5, at the termination of audio recording, the audio engine 418 makes a call to the endpoint module 416 to stop recording. The virtual channel (412, 426) is closed, upon which data recording is stopped on the TS client device 402.

Finally, FIG. 7 illustrates one protocol for measuring bandwidth during data transmission and for adjusting the format to best suite the available bandwidth. As indicated there, the TS client device 402 sends a short notification message to the TS server device 404, followed by a larger data message. The short message has a negligible size, while the larger message has a size S. The larger message may comprise a transmission of one or more packets of actual audio data. Alternatively, the larger message can comprise non-audio data.

The TS server device 404 records time stamps associated with the receipt of the short message and the longer data message. Based on this time stamp information (and the size S of the larger data message), the TS server device 404 measures the bandwidth in the manner described above, and then selects a format that is best suited for the measured bandwidth.

The TS server device 404 next sends a format selection message to the TS client device 402. (In one case, the TS server device 404 only sends a format selection message upon a change in format). In one case, the TS server device 404 may receive plural pairs of short and larger messages from the TS client device 402 before the format change message reaches the TS client device 402. Upon receiving the format change message from the TS server device 404, the TS client device 402 formally changes the format that is using to compress audio data. Then, the TS client device 402 sends a change-completed notification message back to the TS server device 404, upon which the TS server device 404 makes a corresponding change to the decompression format that is used to decompress the audio data that it receives from the TS client device 402.

The above-described process is repeated periodically during the transmission of audio data from the TS client device 402 to the TS server device 404.

B.2. Audio Playback

The case of audio playback is similar to the case of audio capture. Both solutions implement audio endpoint modules 416 that are instantiated by the audio engine 418. The endpoint modules 416 open a virtual channel (412, 426) to the TS client device 402 to redirect audio data.

In operation, the TS server device 404 enumerates its available formats and sends this list to the TS client device 402. The TS client device 402 probes this list and returns a list of its own supported formats (along with its supported audio capabilities). Then, the TS server device 404 caches these formats for later use in the manner described above. The TS server device 404 can also use various setup or configuration messages to form an initial estimate of available bandwidth.

The system 400 computes bandwidth in the case of audio playback in a manner that is similar to that described above for audio capture. Namely, the TS server device 404 sends a small message to the TS client device 402, followed by a larger message. The larger message may comprise audio data for playback or some other type of data. The TS client device 402 can record the timing at which these two messages are received. The TS client device 402 can communicate this timing information to the TS server device 404 in one or more confirmation messages. For example, in one implementation, the TS client device 402 can send a confirmation message to indicate receipt of the larger data message. Upon receipt of the timing information, the TS server device 404 can compute the bandwidth in the same manner described above.

The TS server device 404 can then select an appropriate format that is best suited for the measured bandwidth. The TS server device 404 can communicate and implement its format selections in a manner similar to that described above for the case of audio capture. After this point, the system 400 can compress and decompress audio data using the selected format (until a new format is selected, upon a significant change in available bandwidth).

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computerized method for sending data over a communication coupling from a first entity to a second entity, comprising:
    sending a small message of a pair of the small message and a larger message from the first entity to the second entity;
    sending the larger message of the pair from the first entity to the second entity;
    determining a bandwidth of the communication coupling based on respective times at which the second entity receives the small message and the larger message, the determining including calculating the bandwidth by subtracting a reception time of the small message from a reception time of the large message and dividing a size of the large message by a result of the subtraction;
    selecting a compression format for subsequent data based on the determined bandwidth; and
    sending the subsequent data from the first entity to the second entity using the selected compression format.

2. The computerized method of claim 1, wherein the first entity is a terminal service (TS) client device and the second entity is terminal service (TS) server device, wherein the TS client device interacts with an application that runs on the TS server device using a remote interaction protocol.

3. The computerized method of claim 2, wherein the subsequent data is sent from the TS client device to the TS server device for recordation by the TS server device.

4. The computerized method of claim 1, wherein the second entity is a terminal service (TS) client device and the first entity is a terminal service (TS) server device, wherein the TS client device interacts with an application that runs on the TS server device using a remote interaction protocol.

5. The computerized method of claim 4, wherein the subsequent data is sent from the TS server device to the TS client device for playback at the TS client device.

6. The computerized method of claim 1, wherein the subsequent data that is sent from the first entity to the second entity is audio data.

7. The computerized method of claim 1, wherein the subsequent data that is sent from the first entity to the second entity is video data.

8. The computerized method of claim 1, wherein the short message is sent to account for latency involved in transmitting messages between the first entity and the second entity.

9. The computerized method of claim 8, wherein the bandwidth is determined based on the amount of time it takes to transmit the larger message having a size S, as corrected for the effects of latency.

10. The computerized method of claim 1, further comprising repeating the sending of the small message, sending of the larger message, determining a bandwidth, and selecting a compression format a plurality of times throughout the transmission of data from the first entity to the second entity.

11. The computerized method of claim 1, wherein one available compression format has a relatively high quality and a relatively low degree of compression.

12. The computerized method of claim 1, wherein one available compression format has a relatively low quality and a relatively high degree of compression.

13. One or more computing devices, comprising:
one or more processors; and
memory to store computer-executable instructions that, when executed by the one or more processors, perform the computerized method of claim 1.

14. A computerized method for sending data over a communication coupling between a terminal service (TS) client device to a terminal service (TS) server device, wherein the TS client device interacts with an application that runs on the TS server device using a remote interaction protocol, comprising:
sending a small message of negligible size belonging to a pair of the small message and a larger message from the TS client device to the TS server device or from the TS server device to the TS client device;
sending the larger message of size S belonging to the pair from the TS client device to the TS server device or from the TS server device to the TS client device;
determining a bandwidth of the communication coupling based on respective times at which the TS client device or the TS server device receives the small message and the larger message, the determining including calculating the bandwidth by subtracting a reception time of the small message from a reception time of the large message and dividing a size of the large message by a result of the subtraction;
selecting a compression format for subsequent data based on the determined bandwidth, wherein a relatively low quality compression format is selected for relatively low available bandwidth, and a relatively high quality compression format is selected for relatively high available bandwidth; and
sending the subsequent data between the TS client device and the TS server device using the selected compression format.

15. The computerized method of claim 14, wherein the subsequent data that is sent between the TS client device and the TS server device is audio data or video data.

16. One or more computing devices, comprising:
one or more processors; and
memory to store computer-executable instructions that, when executed by the one or more processors, perform the computerized method of claim 14.

17. A system comprising:
a processor; and
a format handling module configured to be operated by the processor and to select a compression format for transmission of data from a first entity to a second entity based on a determined bandwidth, the first entity and the second entity being coupled together by a communicative coupling, and the format handling module including:
a bandwidth determination module configured to determine the determined bandwidth based on respective times at which the second entity receives a small message and a larger message belonging to a pair of the small message and the larger message, the determining including calculating the bandwidth by subtracting a reception time of the small message from a reception time of the large message and dividing a size of the large message by a result of the subtraction;
a format store that stores information regarding a plurality of different compression formats; and
a format selection module configured to select a compression format identified in the format store based on the determined bandwidth,
wherein data is sent from the first entity to the second entity via the communicative coupling using the selected compression format.

18. The system of claim 17, wherein the first entity is a terminal service (TS) client device and the second entity is a terminal service (TS) server device or wherein the first entity is the TS server device and the second entity is the TS client device, wherein the TS client device interacts with an application that runs on the TS server device using a remote interaction protocol.

* * * * *